United States Patent
Varekamp et al.

(10) Patent No.: US 12,488,531 B2
(45) Date of Patent: Dec. 2, 2025

(54) MULTI OBJECT SURFACE IMAGE (MOSI) FORMAT

(71) Applicant: KONINKLIJKE PHILIPS N.V., Eindhoven (NL)

(72) Inventors: Christiaan Varekamp, Veldhoven (NL); Andy Willems, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 143 days.

(21) Appl. No.: 18/578,032

(22) PCT Filed: Jul. 12, 2022

(86) PCT No.: PCT/EP2022/069411
§ 371 (c)(1),
(2) Date: Jan. 10, 2024

(87) PCT Pub. No.: WO2023/285435
PCT Pub. Date: Jan. 19, 2023

(65) Prior Publication Data
US 2024/0320900 A1    Sep. 26, 2024

(30) Foreign Application Priority Data
Jul. 14, 2021  (EP) .................................. 21185484

(51) Int. Cl.
*G06T 15/20*    (2011.01)
*G06T 7/55*     (2017.01)
(Continued)

(52) U.S. Cl.
CPC .............. *G06T 15/205* (2013.01); *G06T 7/55* (2017.01); *G06T 7/70* (2017.01); *G06T 15/04* (2013.01);
(Continued)

(58) Field of Classification Search
CPC .................................................... G06T 15/205
See application file for complete search history.

(56) References Cited

U.S. PATENT DOCUMENTS

| 9,001,116 B2 | 4/2015 | Ben-David et al. |
| 2014/0132601 A1 | 5/2014 | Raghoebardayal et al. |

(Continued)

FOREIGN PATENT DOCUMENTS

| JP | 2019046077 A | 4/2019 |
| WO | 2021048276 A1 | 3/2021 |

OTHER PUBLICATIONS

International Search Report from PCT/EP2022/069411 mailed Sep. 5, 2022.

(Continued)

*Primary Examiner* — Shivang I Patel

(57) ABSTRACT

A method for processing multi-view image data. The method comprises obtaining source view data from a plurality of sensors, the source view data containing source texture data and source depth data of a scene with one or more objects. The positions of one or more of the objects in the scene are obtained and a stack of layers is generated in a virtual scene for at least one of the objects, wherein the position of a stack of layers in the virtual scene is based on the position of the corresponding object in the scene. Generating a stack of layers comprises generating a plurality of layers, wherein each layer comprises texture data and transparency data for the corresponding object.

14 Claims, 3 Drawing Sheets

(51) Int. Cl.
*G06T 7/70* (2017.01)
*G06T 15/04* (2011.01)

(52) U.S. Cl.
CPC ............... *G06T 2207/20224* (2013.01); *G06T 2210/62* (2013.01)

(56) References Cited

U.S. PATENT DOCUMENTS

| | | | |
|---|---|---|---|
| 2020/0226736 A1 | 7/2020 | Kar et al. | |
| 2020/0228774 A1* | 7/2020 | Kar | G06T 15/08 |
| 2021/0211593 A1* | 7/2021 | Overbeck | G06T 15/06 |
| 2021/0368157 A1* | 11/2021 | Overbeck | H04N 13/161 |

OTHER PUBLICATIONS

Zhou et al "Stereo Magnification: Learning View Synthesis using Multiplane Images", arxiv.org, Cornell University Library, 201 Olin Library Cornell University Ithaca, NY 14853, May 24, 2018 (May 24, 2018), XP080882127, the whole document.

Attal Benjamin et al: "MatryODShka: Real-time 6DoF Video View Synthesis Using Multi-sphere Images", Nov. 3, 2020 (Nov. 3, 2020), Intelligent Robotics and Applications; [Lecture Notes in Computer Science; Lect.Notes Computer], pp. 441-459, XP047593655, ISSN: 0302-9743 ISBN: 978-3-030-89846-5 the whole document.

R. Szeliski and P. Golland. Stereo Matching with Transparency and Matting, Richard Szeliski and Polina Golland, IJCV 1999.

J. Flynn et.al. 2019. DeepView: View synthesis with learned gradient descent. 2019 IEEE/CVF Conference on Computer Vision and Pattern Recognition (CVPR).

https://en.wikipedia.org/wiki/Alpha_compositing downloaded Dec. 11, 2023.

Lin et al "Deep Multi Depth Panoramas for View Synthesis" Computer Vision and Pattern Recognition Aug. 4, 2020.

Flynn et al "Deep View: View Synthesis with Learned Gradient Descent" Computer Vision and Pattern Recognition Jun. 2019.

Broxton et al "Immersive Light Field Video with Layered Mesh Representation" ACM Trans. Graph., vol. 39, No. 4, Article 86. Publication date: Jul. 2020.

Attal et al "MatryODShka: Real-time 6DoF Video View Synthesis using Multi-Sphere Images" Published at European Conference on Computer Vision (ECCV 2020).

* cited by examiner

MULTI OBJECT SURFACE IMAGE (MOSI) FORMAT

CROSS-REFERENCE TO PRIOR APPLICATIONS

This application is the U.S. National Phase application under 35 U.S.C. § 371 of International Application No. PCT/EP2022/069411, filed on Jul. 12, 2022, which claims the benefit of EP patent application Ser. No. 21/185,484.9, filed on Jul. 14, 2021. These applications are hereby incorporated by reference herein.

FIELD OF THE INVENTION

The invention relates to the field of multi-view image formats. In particular, the invention relates to the processing and rendering of a format for multi-view image frame data.

BACKGROUND OF THE INVENTION

Existing approaches that render from multi-view image with depth combine the warped textures from multiple source view (capture) cameras using blending. The blending operation can depend on variables such as source and target camera position/orientation (e.g. ray angle differences), depth magnitude, depth variation, de-occlusion, transparency and color. Some techniques even use a trained convolutional neural network to align textures in the target viewpoint. There are several formats for storing multi-view images.

Multi Plane Image (MPI) and Multi Sphere Image (MSI) techniques construct color and transparency for a predefined set of planes or spheres in 3D space. For a new virtual viewpoint, the image is then constructed using back-to-front over-compositing of the layers.

Recently, MPI and MSI have become popular as 3D image formats for representing multi-view video. The MPI and MSI formats consists of multiple colored images with transparency positioned at varying depth (planes) or distances (spheres) from a point. When creating a new virtual viewpoint, the colored layers are shifted with respect to each other and the colors are then composited together.

While the MPI and MSI formats seem suitable for representing multi-view video, some problems remain. For example, the formats typically consist of many (>100) frame size RGBA (i.e. color and transparency) depth layers thereby automatically expanding the original multi-view captured pixel data related size rather than reducing the pixel data related size. Hence, a specific data rate reduction step will be needed to make real-time streaming possible.

JP 2019046077 A discloses a video synthesizing apparatus capable of synthesizing free viewpoint video with less calculation amount with less memory resources in a computer by setting a plurality of surfaces having an orientation according to a designated viewpoint orientation.

SUMMARY OF THE INVENTION

Both MPI and MSI formats place layers at pre-determined and fixed positions irrespective of the observed scene. Moreover, these layers are typically spread out in a uniform fashion over space (sometimes denser close to the capture system than further away from the capture system). In practice, the placement of layers everywhere is likely to cause the introduction of ghost objects. For instance, recent works show that MPI is over-parameterized for real scenes that consist of large areas of empty space. The suggested solution for this problem is enforcing sparsity on the layers. However, enforcing sparsity on the layers may reduce the visual quality of objects in the scene.

The invention is defined by the claims.

According to examples in accordance with an aspect of the invention, there is provided a method for processing multi-view image data, the method comprising:
  obtaining source view data from a plurality of sensors, the source view data containing source texture data and source depth data of a scene with two or more objects;
  obtaining the position of two or more of the objects in the scene; and
  generating two or more stacks of layers in a virtual scene for at least two of the objects, wherein:
    each stack of layers corresponds to a different object,
    the position of each stack of layers in the virtual scene is based on the position of the corresponding object in the scene; and
    generating each stack of layers comprises generating a plurality of layers, wherein each layer comprises texture data and transparency data for the corresponding object.

Typically, layered approaches to multi-view images use layers (planes) spaced out in the virtual scene. The spacing of the layers is usually constant or based on the distance from a target viewpoint. However, the inventors have realized that these formats use a large amount of data to store and transmit and thus may not always be suitable (e.g. particularly for real-time broadcasting). For example, most layers would have a significant number of pixels with 100% transparency and would thus not contain any useful data of any of the objects whilst still having to be stored.

Thus, the inventors propose generating a stack of layers for each object but having the stack of layers positioned in the virtual scene where the object would be in the scene. In this way, layers are mostly positioned by (or near) objects and the number of pixels with 100% transparency can be significantly reduced. This is possible from obtaining the positions of the objects in the scene.

The positions of the objects could be obtained from a segmentation of the source texture data and/or the source depth data. Trained machine learning algorithms could also be used to detect the positions of the objects. Other methods for obtaining the positions of the objects will be known to a person skilled in the art. For example, in a soccer match, the position of the soccer field and the stadium could be obtained from a user-generated 3D model and the position of the players and the ball could be obtained from object detection algorithms.

Alternatively, the objects could be generated in a scene by a graphics engine and the position of the object would thus be known from where the object was generated in the scene by the graphics engine.

The position of a stack of layers could be defined, for example, by a 3D coordinate defining the center of the stack of layers and the size and/or geometry of the stack. Alternatively, the position of a stack of layers can be defined by an arbitrary pixel of an arbitrary layer in the stack of layers, the number of layers and the spacing of the layers. Each pixel in a layer could have an RGBA (i.e. color and transparency).

Some thin or semi-transparent objects (e.g. the soccer goal net) may be better represented (i.e. resulting in higher image quality) as transparent layers than as a textured mesh or a blend of multiple warped textures from a multi-view with depth format. This could then result in an overall system where the different formats (e.g. mesh, multi-view with depth and MOSI) are spatially combined to describe a scene. Note that at least the relevant texture/depth map and alpha map data may be packed together in a single video file for transmission. In such a hybrid format scenario, the metadata could indicate what is where in the packed video texture atlas.

The particular format relating to the stacks of layers representing objects in their respective positions may be referred to as the Multi Object Surface Imaging (MOSI) format.

The orientation of the stack of layers in the virtual scene may be based on one or more of: the position of the corresponding object in the scene, the orientation of the corresponding object in the scene, the geometry of the corresponding object, a-priori knowledge of the corresponding object, the position of one or more of the plurality of sensors, the orientation of one or more of the plurality of sensors and the position of an intended viewing zone.

The orientation of the object could be measured from the source view data (i.e. position, orientation and/or geometry of object). For example, for elongated objects, the layers in the stack may be generated parallel (or close to parallel) to an axis defined by the elongated object.

Alternatively, the orientation of an object may already be known. For example, the orientation of a soccer field will always be known from any viewpoint as it does not change.

If the scene (and objects in the scene) are generated by a graphics engine, the position, geometry and orientation of the object (or sensors) could be obtained from the graphics engine.

In case the layers in a stack of layers are planar, the plane orientations may be selected such that they have their normal parallel to the mean viewing direction of a viewing zone.

The intended viewing zone may be in a six degrees of freedom (6DoF) region (i.e. position and orientation) in which a viewer is supposed to move (and get acceptable image quality). It relates to the sensor capture configuration which is designed to capture a given viewing zone (i.e. dependent on the number of cameras, field-of-view, position/orientation).

The shape of the layers corresponding to a stack of layers may be based on one or more of: the position of the corresponding object in the scene, the orientation of the corresponding object in the scene, the geometry of the corresponding object and a-priori knowledge of the corresponding object.

The shape of the stack of layers may be spherical, cylindrical or rectangular for example. The shape of the stack may be based on the shape of the layers which make up the stack. The layers may be a cylindrical shell, a spherical shell or a plane depending on the shape of the corresponding stack of layers. For example, a soccer ball may benefit from spherical layers in the corresponding stack whereas a soccer field may benefit from planar layers in the corresponding stack.

In a purely graphics engine based workflow, the shape of the layers could consist of shrunk or expanded object surfaces where these have shrunk or expanded along the normal vector of the true surface geometry. A graphics engine render/export script could then generate the MOSI format for the object.

Obtaining the position of one or more objects in the scene may be based on obtaining a background model of the scene containing background depth data of the background of the scene, thereby containing the position of the background, subtracting the background depth data from the source depth data, detecting foreground objects in the subtracted data and determining a position of the foreground objects in the virtual scene, wherein the position of the objects is based on the position of the background and the position of the foreground objects.

The method may further comprise generating one or more additional stacks of layers for one or more of the objects thereby to make the objects fully visible when viewed from any point in a target viewing space using at least one of the stack of layers or the additional stacks of layers, wherein an additional stack of layers for a first object has a different orientation to the stack of the layers for the first object and wherein a target viewing space defines a sub-space in the virtual scene from which a viewer can view the virtual scene.

Depending on the shape of the stack of layers, rendering the texture data of the layers may create artefacts which may prevent the object from being fully visible when viewed from certain angles. For example, if planar layers are viewed from an axis parallel to the planar layers, the full texture data of the layers might not be visible to the viewer. Similarly, if a cylindrical layer is viewed from above the texture data might not be fully visible.

Thus, a target viewing space can be defined from which a viewer could view the virtual scene. If the texture data of the layers in a stack of layers is not visible from one or more points in the target viewing space, additional stacks of layers can be generated for the corresponding object (e.g. different orientation and/or shape) such that the object will always be visible without artefacts within the target viewing space. An additional stack of layers will have a different orientation to the "original" stack of layers for the same objects. For example, the layers in the additional stack of layers may be orthogonal or almost orthogonal (e.g. between 70 and 110 degrees) to the layers in the stack of layers.

A first stack of layers, corresponding to a first object, may be generated such that the layers in the first stack of layers intersect the layers in a second stack of layers corresponding to a second, different, object (e.g. a background object).

If a stack of layers representing a soccer player is not intersecting a stack of layers representing a soccer field, when the virtual scene is viewed from certain angles the soccer player may look like he is floating above the soccer field. Thus, intersecting both stacks of layers ensures the virtual scene does not look "unnatural". The sections of the layers which intersect may, for example, be blended when being rendered.

The method may further comprise receiving a data allocation for each known object in a set of known objects and storing the layers in a stack of layers for the known object at a first resolution and/or first frame rate based on the data allocation for the known object.

When broadcasting multi-view image frames, there is typically a limit to the size of each frame based on the type of network used for broadcasting (e.g. 4G, 5G etc.). Thus, a data allocation can be given to each object in order to ensure that all objects can fit within the limit of the network.

For example, each layer for a background object (e.g. soccer field) can be stored in an 8 k frame with a relatively low frame rate (e.g. 10 fps) whereas a foreground object (e.g. soccer ball) can be stored in a 4 k frame with a relatively high frame rate (e.g. 30 fps).

The method may further comprise generating metadata for the stacks of layers, the metadata containing one or more of: the position of the stack of layers, the orientation of the stack of layers, the number of layers in the stack of layers, the spacing between layers, the type and/or shape of the layers and the dynamics of the stack of layers.

Additionally, the spacing between layers may be a function of the position of the stack of layers.

The dynamics of a stack of layers refers to any temporal coding of the stack. For example, the global position or orientation of the stack of layers may change over time. Alternatively, the spacing of the stack or number of layers in the stack may change over time when, for example, an object moves further away from the average viewing position and thus less look-around effect needs to be modelled.

The source texture data may comprise a plurality of source view images and wherein generating the texture data and transparency data for a layer is based on the texture data from the source view images.

Generating texture data and transparency data from source view images will be known to a person skilled in the art. For example, generating the texture data and transparency data comprises projecting each source view image onto the virtual scene, wherein each source pixel in the source view image has a corresponding position in the virtual scene. For each one of the layers, it further comprises determining for each source pixel in each source view image: a proximal pixel being the pixel in the layer closest to the source pixel in the virtual scene, a source to layer distance between the proximal pixel and the source pixel, and a weight based on the source to layer distance. A target color value can be generated for each layer pixel in the layer based on the weights corresponding to the layer pixel and a source color value of each one of the source pixels used to find the source to layer distances for the corresponding layer pixel.

Alternatively, the weight may be determined based on the angle between a vector from the source camera to the source pixel and a vector that lies orthogonal to the target plane and intersects it in the target pixel (i.e. the target plane essentially corresponds with a parallel projection instead of a perspective projection).

Finding the texture and transparency data for a layer can be done for each pixel in the layer based on the source view images. Each source view image is projected onto the virtual scene and the closest pixel in a layer (i.e. proximal pixel) to each pixel of each source view image is found (i.e. source pixels). The distance between a source pixel and the corresponding proximal layer pixel gives an estimate of the importance/weight of the source pixel's contribution to the layer pixel. For example, the source pixels which are far from the layer are less likely to contain a color value relevant to a pixel for the layer whereas closer source pixels are likely to be more relevant.

The distance (i.e. source to layer distance) between a source pixel and the corresponding proximal pixel in a given layer can be used to determine a weight. The weight can then be used to generate a target color value for the target pixel by, for example, weighting the color of each source pixel with the corresponding weight and finding the sum of the weighted source color values. Alternatively, the source view pixel with the highest weight value is used for the color of the layer pixel. Other alternative sampling schemes may also be adopted.

The source view data may comprise texture images of the scene and the source texture data and the source depth data may be obtained by performing depth estimation on the texture images.

The invention also provides a method for rendering multi-view image data depicting a scene with two or more objects, the method comprising:

receiving two or more stacks of layers for a virtual scene, wherein:
 each stack of layers corresponds to a different object,
 the position of each stack of layers in the virtual scene is based on the position of the corresponding object in the scene, and
 each stack of layers comprises a plurality of layers, wherein each layer comprises texture data and transparency data for the corresponding object:
receiving a target viewpoint within the virtual scene; and
rendering the stacks of layers based on the target viewpoint.

The method may further comprise sorting the stacks of layers based on the distance between the position of the stacks of layers and the position of the target viewpoint in the virtual scene.

Rendering the stacks of layers may be performed in decreasing order of the distance from each stack of layers to the target viewpoint and wherein rendering the layers in each stack of layers is in decreasing order based on the distance between the position of each layer and the position of the target viewpoint.

The invention also provides a computer program product comprising computer program code means which, when executed on a computing device having a processing system, cause the processing system to perform all of the steps of the afore-mentioned methods of processing and rendering multi-view data. A processor is also provided to execute the code.

The invention also provides a bitstream containing multi-view image frame data depicting a scene with two or more objects, the bitstream comprising a video bitstream, wherein the video bitstream includes two or more stacks of layers in a virtual scene for at least two respective objects in the scene and wherein:
 each stack of layers corresponds to a different object,
 the position of each stack of layers in the virtual scene is based on the position of the respective object in the scene, and
 each stack of layers comprises a plurality of layers, wherein each layer comprises texture data and transparency data for the corresponding object.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
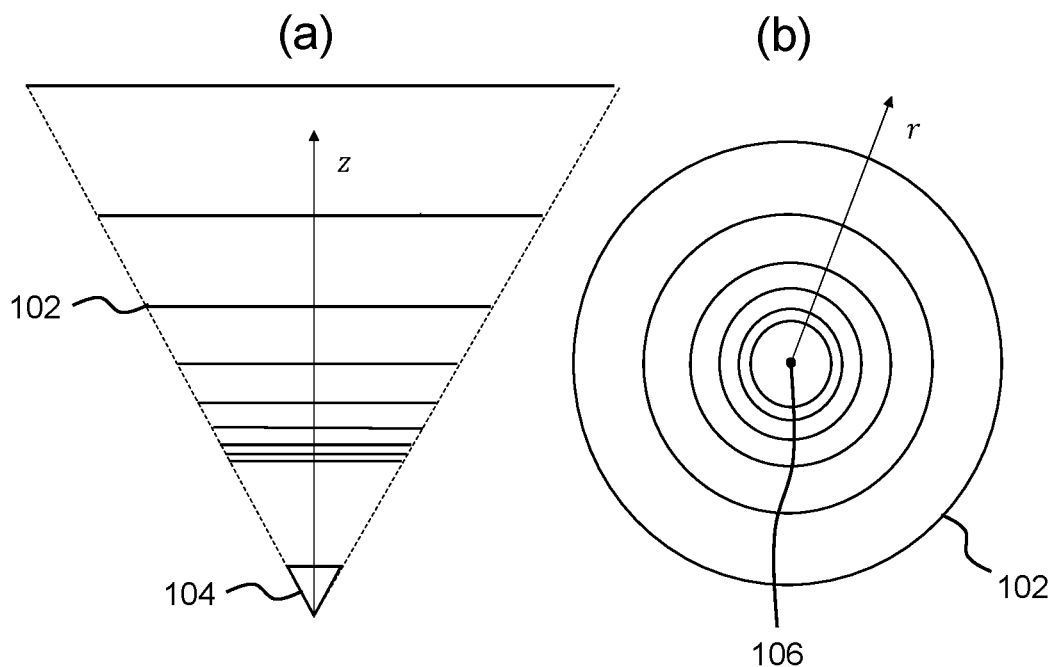
FIG. 1 shows an illustration of the MPI and MSI formats.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for processing multi-view image data. The method comprises obtaining source view data from a plurality of sensors, the source view data containing source texture data and source depth data of a scene with one or more objects. The positions of one or more of the objects in the scene are obtained and a stack of layers is generated in a virtual scene for at least one of the objects, wherein the position of a stack of layers in the virtual scene is based on the position of the corresponding object in the scene. Generating a stack of layers comprises generating a plurality of layers, wherein each layer comprises texture data and transparency data for the corresponding object.

FIG. 1 shows an illustration of the MPI and MSI formats. FIG. 1 (a) shows an illustration of the layers 102 in an MPI format. In this example, the layers 102 are spaced out relative to how far away they are from the viewpoint 104. The layers 102 for MPI are planes parallel to each other containing RGBA (i.e. color and transparency) data for each pixel and the spacing between each layer 102 is defined with respect to the depth from the viewpoint (i.e. the z direction).

FIG. 1 (b) shows an illustration of the layers 102 in an MSI format. Similarly to the MPI format, the layers 102 are spaced out relative to how far away they are from the center viewpoint 106. The layers 102 are spherical in shape and with as center viewpoint 106, where the spacing of the layers 102 is defined relative to the radius (in the r direction) of the previous closer layer 102, for example.

Alternatively, the layers 102 in FIG. 1 (a) and/or FIG. 1 (b) could have a constant or arbitrary spacing.

Reference numbers are not provided for all layers 102 in any of the figures in order to reduce the complexity of the figures.

Figure 2:
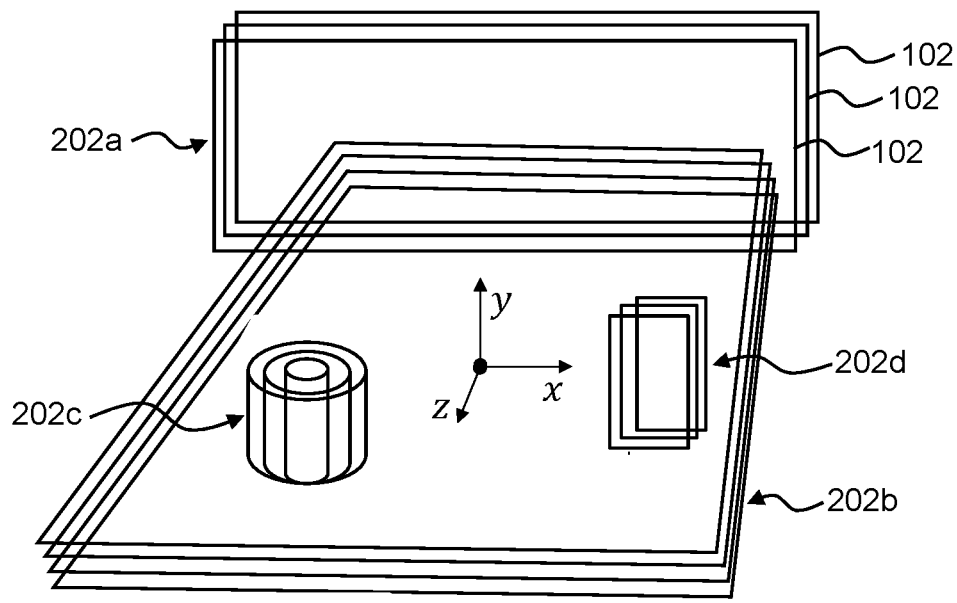
FIG. 2 shows an illustration of the multi object surface image (MOSI) format.

FIG. 2 shows an illustration of the multi object surface image (MOSI) format. Four stacks of layers 202 are shown in FIG. 2 corresponding to four different objects. Stack 202a corresponds the background of the scene, stack 202b corresponds to the ground of a scene and stacks 202c and 202d correspond to two objects standing on the ground.

The background and ground stacks 202a and 202b are planar stacks with three layers 102 each. The number of layers 102 per stack 202 may depend on the processing systems used, and/or the intended use of the MOSI format. Three layers 102 are shown in FIG. 2 purely for illustrative purposes.

The stack 202c corresponds to an object on the ground (e.g. soccer player on a soccer field) and is a cylindrical stack. The layers 102 in stack 202c are hollow cylinders. The stack 202d also corresponds to an object on the ground but the stack 202d is a planar stack where the layers 102 are planes.

The choice of shape for the stacks 202 (e.g. planar, cylindrical or spherical) may depend on the position of the object in the scene and/geometry of the corresponding object. For example, a stack 202 may have layers 202 with the shape of the surface of the object and thus the stack 202 would have the shape of the object.

The position of each stack of layers 202 is directly related to the geometry of the scene. In other words, the position of objects in a scene defines the position of the corresponding stack of layers 202 in a virtual scene.

The invention proposes to produce multi object surface images (MOSI) for a set of objects in the scene. Instead of creating pre-defined depth layers 102 that are unrelated to the scene geometry, the proposed MOSI format concentrates 3D surfaces (planes, cylinders, spheres) in stacks of layers 202 around the position where objects are actually located. In this way, prior knowledge about the scene geometry is used. The MOSI format therefore adapts to the specific geometry of a captured scene.

The MOSI format is more compact in terms of pixel rate and ghost objects are unlikely to occur far away from scene elements. This more compact MOSI format may also be faster when synthesizing new views.

Similarly to the MPI and MSI formats, it is proposed to store RGBA data for each pixel in the layers 102. However, the MOSI format creates multiple stacks of layers 202 that have different locations in space corresponding to a-priori known locations where objects are in the scene. As with MPI and MSI, a single layer 102 in MOSI also consists of color and transparency information.

For MPI and MSI, rendering from the format to produce the final image is done in back to front order using alpha compositing with the so-called 'over' operator. For the proposed MOSI format, this is also done within a stack 202, but not between stacks 202. In the MOSI format, a stack 202 corresponds to a given object in 3D space. Before rendering, stacks 202 may be sorted based on their position relative to a viewpoint. Stacks 202 can then be drawn, one after the other, with decreasing depth order from the viewpoint.

The following procedure describes a method for defining the geometric position of MOSI stacks 202 starting from captured multi-view images. The example is for a typical sports scene as captured from the side of the arena:

Capture images with multiple cameras (e.g. 16 cameras) from the side of a sports field;

Perform plane fitting to determine the plane parameters of a ground surface and a background;

Place a first stack 202 with five layers 102 with a separation of ten centimeters in height around the fitted ground plane surface;

Create a second stack 202 with five layers with a separation of 5 meters at the average distance of the background;

Perform depth estimation for each view using image matching with neighbor views thereby using the fitted ground and background models to constrain the resulting depth values;

Subtract a depth map that contains the fitted ground surface background from the estimated depth map and convert this to a binary foreground object mask using thresholding. The binary mask may contain, for example, sports players and the ball;

Detect a variable number of rectangles with a variable position using the binary mask; and Create a variable number of further stacks 202 by placing five planes per object at the average depth inside the rectangle spaced 20 cm apart (covering the size of a player).

The depth estimation step between views may be omitted when a separate laser scanner (or depth sensor) is added to the multi-camera setup to capture a 3D point cloud. In that case, the above algorithm will change in that the stacks of layers 202 will be placed at dense clusters of points in the point cloud which correlate to objects in the scene.

Now that the stack of layers 202 for the MOSI format has been defined, the following steps can be used to create an RGBA texture for each layer 102 in all stacks 202 using the captured multi-view camera images (i.e. source views) as input:

Project all source views i onto all surfaces j (i.e. all layers) and calculate a per target pixel weight $w_{ij}(u, v)$ that depends on the shortest distance of the 3D pixel position in source view i to surface j. The smaller the distance, the larger the weight. For example:

$$w_{ij}(u, v) = e^{-k|x_i(m,n)-x_j(u,v)|}$$

where $x_i(m, n)$ is the 3D point position at source view image coordinate (m, n) derived from the depth map of source i, $x_j(u, v)$ is the closest point that lies on target surface j, k is a constant parameters (e.g. with value ⅒) and (u, v) is the target texture coordinate that will contain the color and transparency related to the texture for surface j:

For all surfaces j, accumulate the weights per target texture coordinate (u, v) over all source views:

$$w_{j,sum}(u, v) = \sum_i w_{ij}(u, v)$$

For all surfaces j, accumulate the product of weight times color per target texture coordinate (u, v) over all source views:

$$c_{j,sum}(u, v) = \sum_i c_{ij}(u, v)$$

For all surfaces j, calculate the final color value c; (u, v) for texture coordinate (u, v) as:

$$c_j(u, v) = \frac{c_{j,sum}(u, v)}{w_{j,sum}(u, v)}$$

For all surfaces j, calculate the final transparency value a (u, v) for texture coordinate (u, v) as:

$$\alpha_j(u, v) = \frac{w_{j,sum}(u, v)}{N_i}$$

where $N_i$ is the number of source views.

As an alternative to the above procedure, the weights $w_{ij}(u, v)$ may be calculated not (only) on the basis of depth difference but on the basis of a more fundamental color match error term that is calculated using the position of the surface j. More specifically, a 3D point that lies on surface j with corresponding texture coordinate (u, v) may be mapped to the source views to retrieve $N_i$ color values.

The statistics of these color values can be used to calculate $w_{ij}(u, v)$. For instance, if for a given source view i, the color difference varies much from the mean of the retrieved color values, then the weight $w_{ij}(u, v)$ is automatically set a relatively low value, the reason being that the 3D points $x_j$ is likely occluded in the source view j. Other statistics, such as color variance or a general histogram of colors may be used to determine $w_{ij}(u, v)$.

To further improve the quality of the MOSI format, deep learning can be applied to generate color and/or transparency pixel values for the layers 102. In that case some form of ground truth may be needed. This ground truth may come from a graphics engine that can directly produce the MOSI format or a further render step may be taken to use the original source views themselves as ground truth. The latter is possible since the render operation is a linear operation, hence differentiable, and thus suitable for the backpropagation in a neural network.

Static stacks 202 can be hand-tuned in an editor to place these relative to static scene objects such as such a sports ground, a goal or a stadium background.

Figure 3:
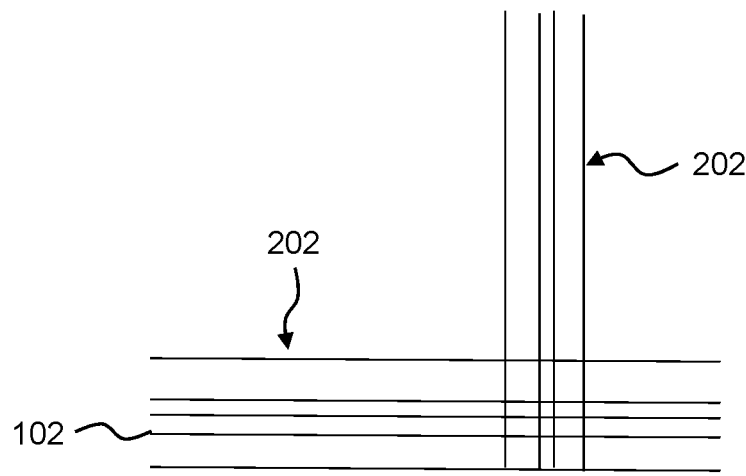
FIG. 3 shows two stacks of layers intersecting.

FIG. 3 shows two stacks of layers 202 intersecting. Artefacts may arise due to the stacks 202 not intersecting. Thus, it may be advantageous for the stacks 202 to be placed such that they overlap. The stacks 202 may intersect to avoid an object looking like it is floating on the ground.

For example, the ground surface of a soccer field may be rendered bottom to top using over-compositing and then a vertically oriented stack (e.g. soccer player) may be rendered back to front using over compositing. This approach requires no special blending of layers. A slight intersection of the two stacks (e.g. at least one pixel) may be needed just to avoid gaps.

Figure 4:
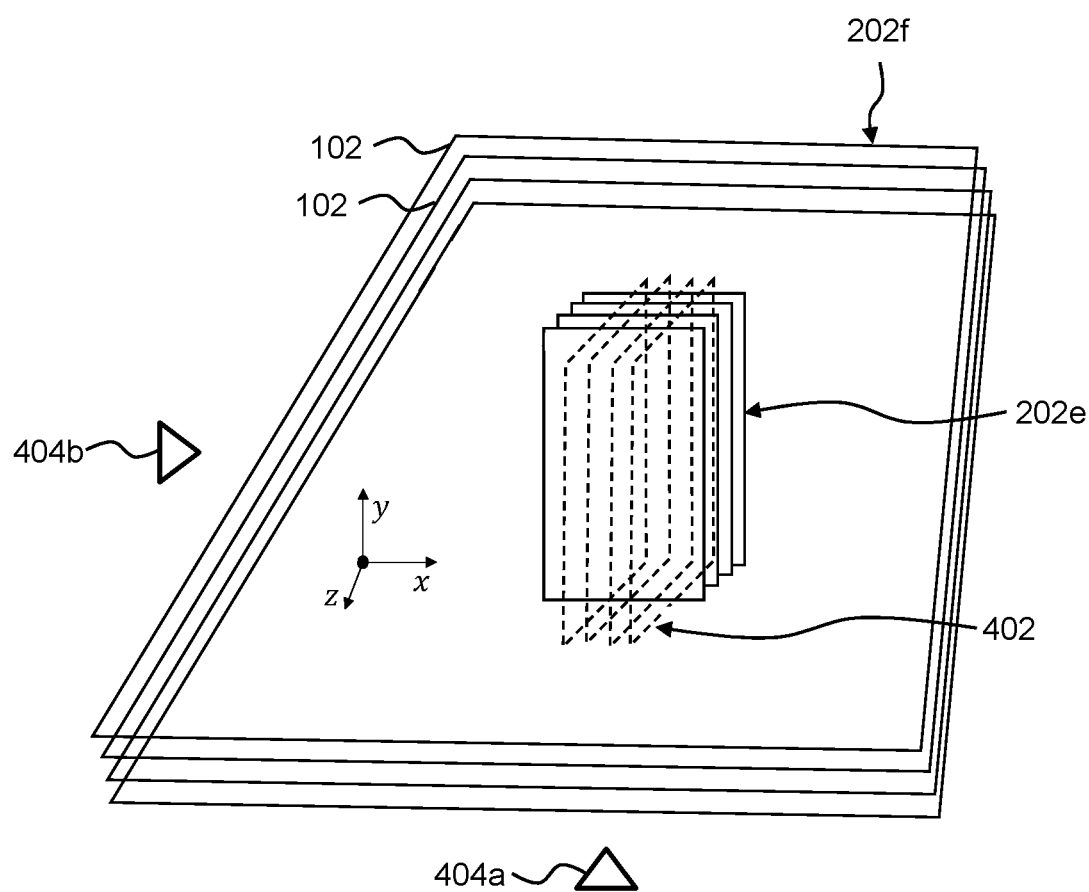
FIG. 4 shows a scene with two stacks of layers and an additional stack of layers.

FIG. 4 shows a scene with two stacks of layers 202 and an additional stack of layers 402. The additional stack of layers 402 may be identical to the stack of layers 202e but rotated by 90 degrees around the normal to the stack 202f. The stack 202f represents the ground in the scene and the stack 202e represents an object on the ground. The additional stack 402 represents the same object as 202e but the layers 102 have a different orientation from the layers 102 in stack 202c.

For example, in some cases it may also be necessary to make some MOSI stacks 202 dependent on a target viewpoint 404. For instance, while the ground of a sport field represented by a planar stack may be suitable for viewing all around, this is not the case for a sports player when represented as a planar stack.

In FIG. 4 two target viewpoints 404a and 404b are shown. When a viewer is viewing the scene from viewpoint 404a, the stack 202e may be used to show the corresponding object in the scene. However, when a viewer is viewing the scene from viewpoint 404b, the stack 202e may not be suitable to show corresponding object (e.g. gaps between the layers 102 would be visible) but the additional stack 402 would be suitable.

Additional stacks 402 may be generated for different target viewpoints 404 and/or based on a space within the scene from which a viewer can view the scene.

Figure 5:
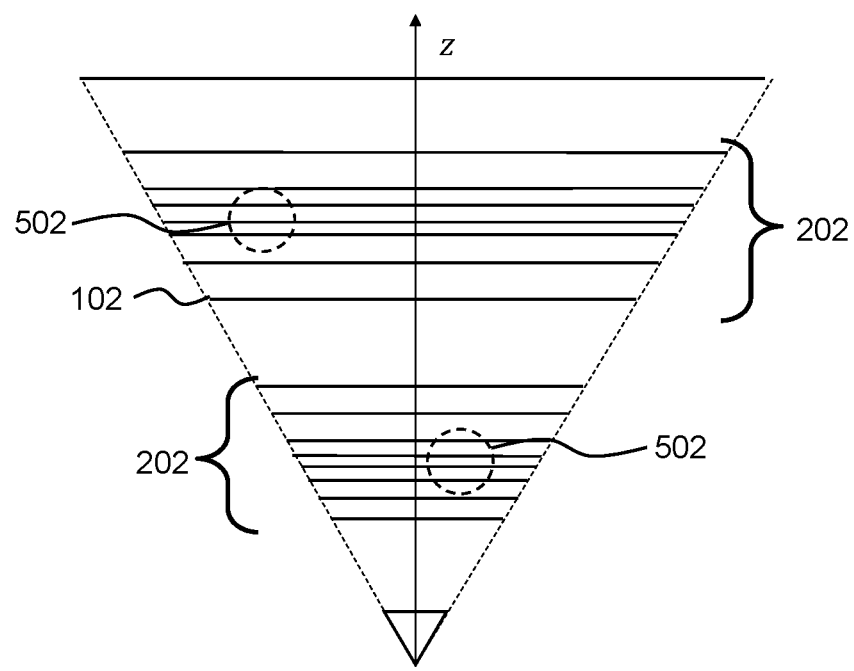
FIG. 5 shows an example of a MOSI format where all the layers are parallel.

FIG. 5 shows an example of a MOSI format where all the layers 102 are parallel. FIG. 5 shows an irregular layer 102 spacing that adapts to the position of objects 502. Stacks of layers 202 are placed at or near the depth of the objects 502. This form of the MOSI format is a modification of MPI that adapts to scene and object information. Variable layer spacing can be useful to account for uncertainties in an object detection process.

Packing:

Due to the dependence on the scene geometry, the typical MOSI pixel data size (the total number of pixels summed over texture maps with each texture map corresponding to one layer 102) will be much less than what is needed for the MPI and MSI.

However, the RGBA pixel values for the layers 102 in all stacks 202 still need to be packed into existing 2K, 4K or 8K frame sizes such that they can be compressed using a video encoder such as HEVC.

A solution that has low computational cost is to define the packing format a-priori depending on the scene that is being imaged. For instance, for a soccer game, the stack 202 corresponding to the ground surface and the stack 202 corresponding to the stadium background may be packed into a single 4K video frame where a lower frame rate is used to reduce the temporal pixel rate.

The soccer players on the other hand can be packed together into a second video where the texture size of the maximum number of players (e.g. 22) can vary such that players close to a target viewpoint can be packed with a higher resolution. Some space can be reserved for unforeseen objects that may enter the scene. Resolution scaling of the texture maps per stack 202 can be applied to always fit the result without losing objects. Note that the above reasoning can often also be applied to other dynamic events (e.g. other sport events).

Metadata:

For a client device to correctly interpret the packed video, metadata which describes the geometric parameters of the MOSI stacks 202 may be needed in addition to the packing strategy that was used.

In particular, the metadata for a single stack 202 may include one or more of:

The position and/or orientation of the stack 202;
The number of layers 102 in the stack 202;
The spacing parameters for the layers 102 in the stack 202 (e.g. Regular-scalar distance or Irregular-distance function);
The type and/or shape of the stack 202 (e.g. planar, spherical, cylindrical, custom, etc.); and
The dynamics of the stack 202 (i.e. the temporal parameters of stack).

The skilled person would be readily capable of developing a processor for carrying out any herein described method. Thus, each step of a flow chart may represent a different action performed by a processor, and may be performed by a respective module of the processing processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
obtaining source view data from a plurality of sensors, wherein the source view data comprises source texture data of a scene and source depth data of the scene, wherein the scene comprise at least two objects;
obtaining the position of the at least two objects; and
generating at least two stacks of layers in a virtual scene for the at least two objects,
wherein each stack of layers of the at least two stacks of layers corresponds to a different object of the at least two objects,
wherein the position of each stack of layers in the virtual scene is based on the position of the corresponding object,
wherein each stack of layers of the at least two layers comprises a plurality of layers,
wherein each layer of the plurality of layers comprises object texture data and object transparency data for the corresponding object.

2. The method of claim 1,
wherein the corresponding object has an object position, an object orientation, an object geometry and an object a-priori knowledge,
wherein each of the plurality of sensors have a sensor position and a sensor orientation
wherein the orientation of each of the stacks of layers of the at least two stacks of layers is based on at least one of the object position, the object orientation, the object geometry, the object a-priori knowledge, the sensor position of at least one of the plurality of sensors, the sensor orientation of at least one of the plurality of sensors, and the position of an intended viewing zone.

3. The method of claim 1,
wherein the corresponding object has an object position, an object orientation, an object geometry and an object a-priori knowledge,
wherein each stack of layers of the at least two stack of layers is based on at least one of the object position, the object orientation, the object geometry, and the object a-priori knowledge.

4. The method of claim 1, wherein obtaining a position of the at least two objects comprises:
obtaining a background model of the scene,
wherein the background model comprises background depth data,
wherein background depth data comprises the position of the background;
subtracting the background depth data from the source depth data;
detecting at least one foreground objects in the subtracted data; and
determining a position of the at least one foreground objects in the virtual scene, wherein the position of the at least two objects is based on the position of the background and the position of the at least one foreground objects.

5. The method of claim 1, further comprising generating at least one additional stacks of layers for at least one of the at least two objects,
wherein the objects are fully visible when viewed from any point in a target viewing space using at least one of the stack of layers or the at least one additional stacks of layers,
wherein an additional stack of layers corresponding to a first object of the at least two objects has a different orientation to the stack of the layers for the first object of the at least two objects,
wherein a target viewing space defines a sub-space in the virtual scene from which a viewer can view the virtual scene.

6. The method of claim 1,
wherein a first stack of layers of the at least two stacks of layers corresponding to a first object is generated such that first stack of layers intersect at least a portion of a second stack of layers of the at least two stacks of layers corresponding to a second, object,
wherein the second object is different from the first object.

7. The method of claim 1, further comprising:
receiving a data allocation for a third object of the at least two objects; and
storing the stack of layers of the least two stacks of layers corresponding to the third object at a first resolution and/or first frame rate based on the data allocation for the third.

8. The method of claim 1, further comprising generating metadata for the at least two stacks of layers, wherein the metadata comprises at least one of:
a position of the at least two stacks of layers;
an orientation of the at least two stacks of layers;
a number of layers in the at least two stacks of layers;
a spacing between layers of the at least two stacks of layers;
a type and/or shape of the layers of the at least two stacks of layers; and
a dynamics of the stack of layers of the at least two stacks of layers.

9. The method of claim 1,
wherein the source texture data comprises a plurality of source view images,
wherein generating the object texture data and the object transparency data for a layer is based on the source texture data.

10. The method of claim 1,
wherein the source view data comprises texture images of the scene,
wherein obtaining the source texture data and the source depth data comprises performing depth estimation on the texture images.

11. A method comprising:
receiving at least two stacks of layers for a virtual scene,
wherein each stack of layers of the at least two stacks of layers corresponds to an object,
wherein the position of each stack of layers of the at least two stacks of layers in the virtual scene is based on the position of the corresponding object in a scene,
wherein each stack of layers of the at least two stacks of layers comprises a plurality of layers,
wherein each layer of the stack of layers comprises object texture data and object transparency data for the corresponding object;
receiving a target viewpoint within the virtual scene; and
rendering the stacks of layers based on the target viewpoint.

12. The method of claim 11,
wherein the rendering is performed in decreasing order of the distance from each stack of layers of the at least two stacks of layers to the target viewpoint,
wherein rendering the layers in each stack of layers of the at least two stacks of layers is based on the distance between the position of each layer and the position of the target viewpoint.

13. A computer program stored on a non-transitory medium, wherein the computer program when executed on a processor performs the method as claimed in claim 1.

14. A computer program stored on a non-transitory medium, wherein the computer program when executed on a processor performs the method as claimed in claim 11.

* * * * *